United States Patent [19]

Nakayama et al.

[11] Patent Number: 5,332,339
[45] Date of Patent: Jul. 26, 1994

[54] THROW-AWAY CUTTING TOOL

[75] Inventors: Masaaki Nakayama; Masayuki Okawa; Junichi Saito; Tatsuo Arai, all of Ibaraki, Japan

[73] Assignee: Mitsubishi Materials Corporation, Tokyo, Japan

[21] Appl. No.: 900,490

[22] Filed: Jun. 18, 1992

[30] Foreign Application Priority Data

Jun. 19, 1991 [JP] Japan ............... 3-046307[U]
Jun. 28, 1991 [JP] Japan ............... 3-050119[U]
Jul. 31, 1991 [JP] Japan ............... 3-060542[U]
Jul. 31, 1991 [JP] Japan ............... 3-060543[U]
Jul. 31, 1991 [JP] Japan ............... 3-060544[U]

[51] Int. Cl.$^5$ ............... B23P 15/30; B23B 27/18
[52] U.S. Cl. ............... 407/101; 76/101.1; 407/104; 407/120
[58] Field of Search ............... 407/101, 46, 32, 118, 407/120, 103, 104; 76/108.1, 108.2, 108.6, 115, 101.1, DIG. 11

[56] References Cited

U.S. PATENT DOCUMENTS

| 4,226,560 | 10/1980 | Kraemer | 407/101 |
| 4,938,639 | 7/1990 | Lockard | 407/103 |
| 5,098,233 | 3/1992 | Patterson et al. | 407/101 |
| 5,139,371 | 8/1992 | Kraft et al. | 407/101 |

Primary Examiner—Steven C. Bishop
Attorney, Agent, or Firm—Cushman, Darby & Cushman

[57] ABSTRACT

A throw-away cutting tool is disclosed. The tool body of the cutting tool consists of a rod-like shank and a bit mounting component arranged at the front end of the shank. The shank is made of cemented carbide, and is formed with a mounting wall extending toward the front end of the tool body. The bit mounting component is made of steel or sintered metal, and is formed with a bit mounting seat defined by a bottom wall and side walls. In the above cutting tool, high resistance against the cutting force produced by cutting operation can be obtained and separation of the shank and the bit mounting component can be prevented; and high rigidity of the tool body is ensured, the damping capacity of the tool body is increased, and therefore vibration and chatter of the cutting tool can be effectively prevented.

5 Claims, 13 Drawing Sheets

THROW-AWAY CUTTING TOOL

BACKGROUND OF THE INVENTION

The present invention relates to a throw-away cutting tool such as a tool, a boring bar, or a milling cutter having an indexable cutter insert (hereinafter referred to simply as "bit") mounted to a bit mounting seat formed at the front portion of a tool body, and in particular, relates to a cutting tool having a shank made of cemented carbide and the bit mounting seat made of steel or sintered metal capable of machining.

A cutting tool such as a tool, a boring bar, or a milling cutter having a shank made of cemented carbide in order to increase the damping capacity and to restrain chatter of the tool body is known. However, in a throw-away cutting tool mounted with a bit employed as a cutting edge, a bit mounting seat cannot be easily formed when the tool body is made of cemented carbide. For this reason, in a prior art cutting tool, the tool body is constructed with a front end portion made of steel or sintered metal and a rear portion made of cemented carbide; the front end portion is formed with a bit mounting seat; the front portion is fixed to the rear portion.

FIGS. 1 and 2 illustrate an example of such a cutting tool. In the Figures, a tool body 1 consists of a cylinder-shaped shank 2 made of cemented carbide and a bit mounting component 3 made of steel or sintered metal. The bit mounting component 3 is formed with a bit mounting seat 4 at the front portion thereof. A bit 5 is secured to the bit mounting seat 4 by a clamping mechanism 6. The rear end 3A of the shank 2 is formed into a cylinder shape having the same diameter as the shank 2. The front end 3B of the bit mounting component is formed into a semicircular cross section by removing the upper half portion of the front end 3B from a plane including an axis O of the cylinder. The rear end face of the bit mounting component 3 is soldered to the front end face of the shank 2 so that the bit mounting component 3 is fixed to the shank. The upper plane face 3C of the bit mounting component 3 is provided with a bit mounting seat 4 and a clamping mechanism 6.

The bit is formed as a positive type bit having an upper face 3C used for a cutting face 3C in the shape of an equilateral triangle. A plurality of cutting edges 5C are formed at the intersections between the upper face 3C and three side faces 5B used for flank faces. The bit mounting seat 4 for mounting the bit 5 is defined by a bottom wall 4A recessed from the upper plane face and side walls 4B and 4C rising up from the bottom wall 4A. The angle between the side walls 4B and 4C is set at 60°. The bit mounting seat 4 is arranged such that the cutting edge 5C of the bit 5 is perpendicular to the axis O of the circular cylinder and slightly projects from the bit mounting component 33 in the direction of the axis O.

The clamping mechanism 6 consists of a clamping bolt 6A secured to the bit mounting component 3 and a clamping piece 6B having a clamping claw 6C at the front end thereof, so that the upper face 5A is pressed by the claw 6C, and lower face 5D opposite to the upper face 5A is adhered to the bottom wall 4A so as to secure the bit 5 to the bit mounting seat 4. The position of the bit 5 is fixed by contacting two of three side faces 5B with the side walls 4B and 4C and by securing the bit 5 with the clamping mechanism 6. A relief 4D is formed at the intersection of the side walls 4B and 4C.

In the above constructed throw-away cutting tool, the tool body 1 is constructed by means of soldering the front face of the cylinder shaped shank 2 to the rear end face, which has the same diameter as the shank 2 of the bit mounting component 3. Therefore, the soldered layer between the front end face of the shank 2 and the rear end face of the bit mounting component 3 exists along the direction perpendicular to the axis O of the tool body 1.

SUMMARY OF THE INVENTION

It is therefore an object of the present invention to provide a throw-away cutting tool which can solve the above problems in the prior art cutting tools. According to the invention, there is provided a throw-away cutting tool comprising a tool body consisting of a rod-like shank made of cemented carbide and a bit mounting component made of steel or sintered metal arranged at the front end of the tool body. The shank is formed with a mounting wall extending toward the front end of the tool body. The bit mounting component is in the shape of a plate. A bit mounting seat is formed at the front end of the bit mounting component. A bit is mounted to the bit mounting seat. The bit mounting component is fixed to the shank adhering the lower face of the bit mounting component to the mounting wall so as to bear cutting force exerted on the bit by the mounting wall.

The bit mounting component can be formed with side walls for supporting the side faces of the bit. The side walls rise from the mounting wall of the shank in the direction of the thickness of the bit mounting component. A portion of the mounting wall connected to the side wall is employed as a mounting wall contacting the lower face of the bit.

The bit mounting component can be formed with a bottom wall parallel to the upper face of the bit mounting component for contacting the lower face of the bit. The bit mounting component is formed with side walls rising from the bottom wall in the direction of the thickness of the bit mounting component. The side walls are used for supporting side faces of the bit. The thickness of the bottom wall of the bit mounting component is preferably set in the range of 0.1 mm to 1.0 mm.

In the cutting tool having the above construction, since the mounting wall extends along the lengthwise direction of the tool body, the cutting force directed toward the perpendicular direction of the axis of the tool body is received by the mounting wall perpendicular to the cutting force. Therefore, in the cutting tool, the cutting force does not act to separate the shank and the bit mounting component.

Furthermore, in the cutting tool, since the shank made of cemented carbide extends as far as the vicinity of the cutting edge, high rigidity of the tool body is ensured, and the damping capacity of the tool body is increased, so that vibration and chatter of the cutting tool can be effectively prevented.

There is also provided another throw-away cutting tool comprising a shank and a plate-like bit mounting component having a bit mounting seat on the upper face thereof. The bit mounting component is formed with a protrusion projecting from the lower face thereof. The protrusion is formed with a tapped hole at the bottom wall of the bit mounting seat. The shank is formed with a hole at the mounting wall of the shank and arranged so as to fit to the protrusion. The bit mounting component is secured to the shank adhering the lower face thereof to the mounting wall of the shank and fitting the protrusion to the hole.

In the above cutting tool, the same advantages as aforementioned cutting tool can be obtained.

There is also provided another throw-away cutting tool comprising a plate-like bit mounting component and a shank having a mounting wall extending toward the front end of a tool body and having a side wall rising from the mounting wall thereof. The bit mounting component is fixed to the shank adhering the lower face thereof to the mounting wall and adhering the side faces to the side wall of the shank.

The bit mounting component can be formed with a tapped through hole extending in the direction of the thickness thereof. The front end of the shank is formed with a through hole coaxially arranged with respect to the tapped hole of the bit mounting component mounted to the shank. A hollow clamping means having a male screw formed on the peripheral outer surface thereof and a female screw formed on the inner side wall thereof is inserted in the through hole and is secured to the tapped through hole, so that the bit mounting component is secured to the shank. The bit is secured by a clamping screw inserted therein and secured to a tapping hole formed by the female screw of the hollow clamping means.

The hollow clamping means comprises a cylinder-shaped shank having a peripheral outer surface and an inner side wall. The outer surface is formed with a male screw, and the inner side wall is formed with a female screw.

In the cutting tool as above, since the side face of the bit mounting component is supported by the side wall rising from the mounting wall, the bit mounting component is secured to the shank more rigidly. In addition, since an L-shaped portion viewed from the front is formed by virtue of the existence of the side wall, the rigidity of the front end of the shank is further increased.

The present invention also provides another throw-away cutting tool comprising a bit mounting component and a shank having a mounting wall in the shape of an arcuate concave face having a center axis parallel to the lengthwise direction of the tool body. The lower face of the bit mounting component is in the shape of an arcuate convex face corresponding to the concave face of the mounting wall. The bit mounting component is mounted to the shank adhering the lower face thereof to the mounting wall.

In the above cutting tool, since the mounting wall is in the shape of an arcuate concave face and the lower face of the bit mounting component is in the shape of a arcuate convex face corresponding to the concave face, the thickness of the bit mounting component is varied along the lateral direction viewed from the front. Therefore, a tapping hole for mounting a bit can be formed at the thickest portion of the bit mounting component, so that the depth of the tapping hole can be effectively ensured without decrease of the thickness of the shank and without machining of the shank made of cemented carbide. Therefore, a so-called screw-on type cutting tool can be easily produced and the rigidity of the tool body can be unsured.

The present invention also provides another throwaway cutting tool comprising a bit mounting component and a shank having a mounting wall in the shape of an arcuate concave face having a center axis perpendicular to the lengthwise direction of the tool body. The lower face of the bit mounting component is the shape of an arcuate convex face corresponding to the concave face of the mounting wall. The bit mounting component is mounted to the shank adhering the lower face thereof to the mounting wall.

In the above cutting tool, the same advantages can be obtained; that is, a screw-on type cutting tool can be easily produced and the rigidity of the tool body can be ensured.

DETAILED DESCRIPTION OF THE INVENTION

Figure 1:
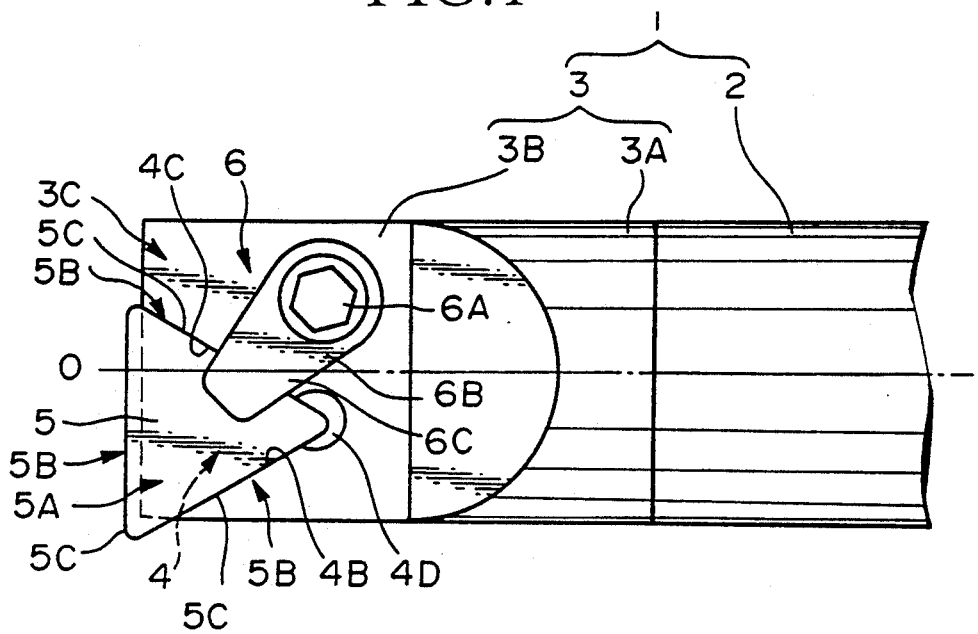
FIG. 1 is plan view of the front end of a conventional cutting tool.
Figure 2:
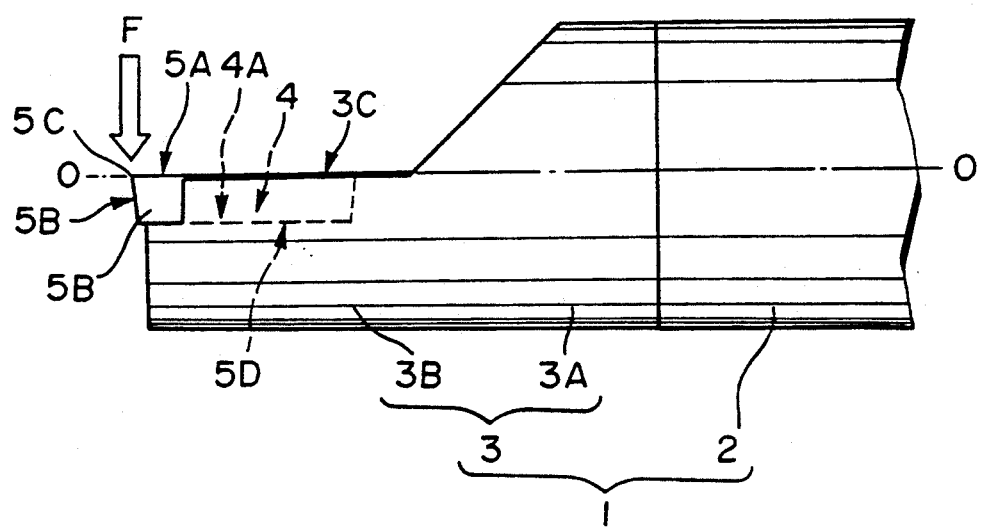
FIG. 2 is a side view of the cutting tool in FIG. 1.
Figure 3:
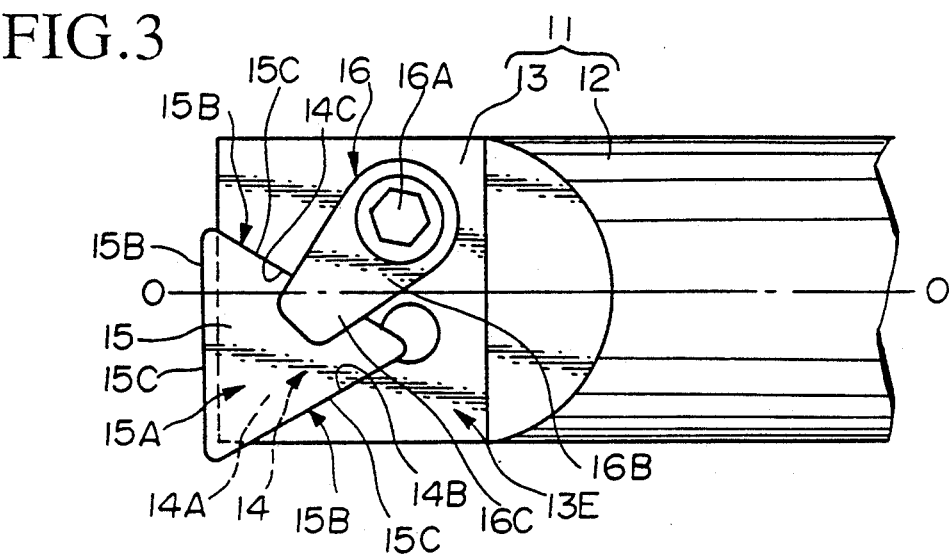
FIG. 3 is a plane view of the front end of a cutting tool according to the first embodiment of the invention.
Figure 4:
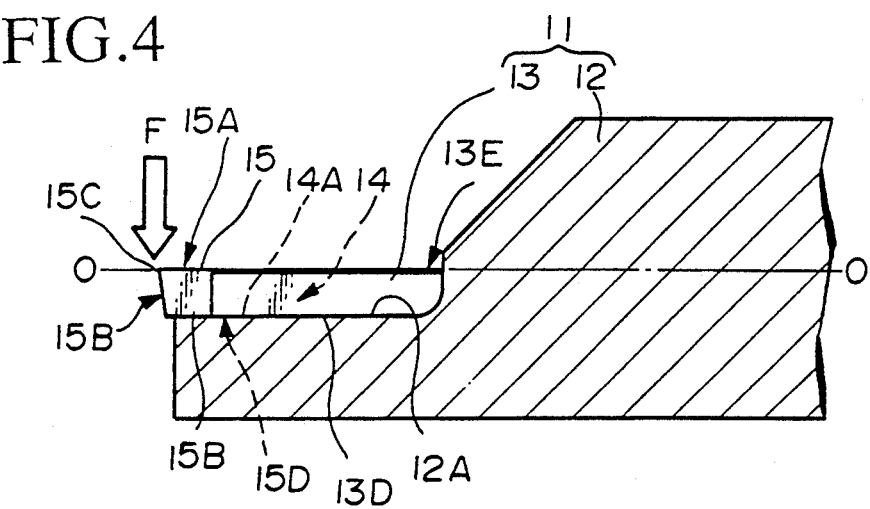
FIG. 4 is a side view of the front end of the cutting tool in FIG. 3.
Figure 5:
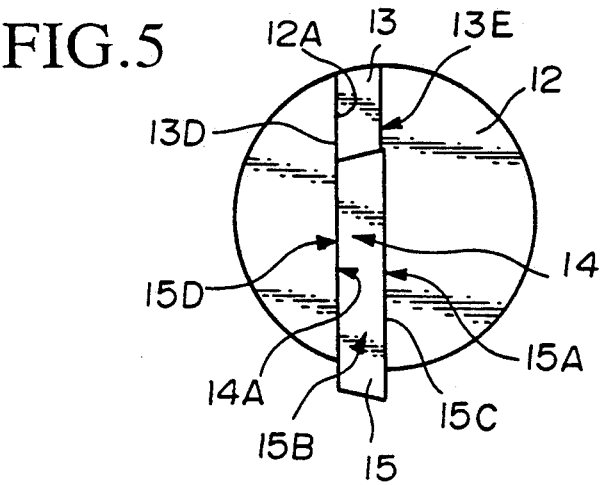
FIG. 5 is an end view of the front end of the cutting tool in FIG. 3 along the direction of the axis O.

FIGS. 3 through 5 illustrate a throw-away cutting tool in accordance with the first embodiment of the present invention. As shown in the Figures, in the embodiment as in the above prior art cutting tool, a tool body 11 consists of a shank 12 and a bit mounting component 13; the bit mounting component 13 is formed with a bit mounting seat 14 to which a bit 15 is secured by a clamping mechanism 16.

The shank 12 is made of cemented carbide and is formed substantially in the shape of a cylinder. The front end of the shank 12 is formed with a square-shaped mounting wall 12A by removing the upper portion of the front end thereof from a plane face under and parallel with respect to the axis O of the tool body 11. The shank 12 is formed with a vertical wall rising from the mounting wall 12A and an inclined wall downslope toward the front end of the shank 12 and connected to the radially outer face of the shank 12 (see FIG. 4).

Figure 6:
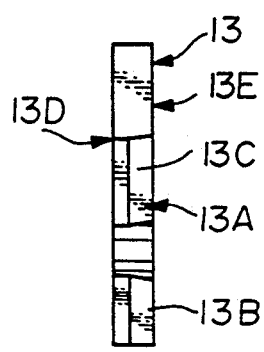
FIG. 6 illustrates a bit mounting component 13 according to the first embodiment, wherein (A) is a side view, and (B) is a plan view.
Figure 6:
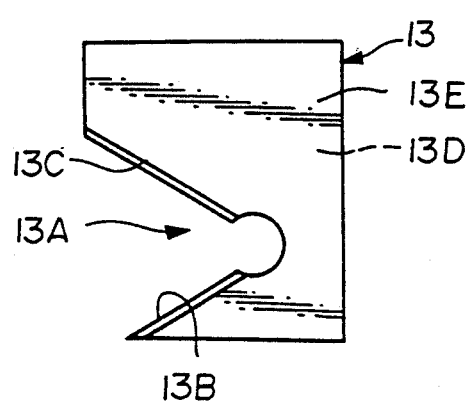

FIG. 6 shows a bit mounting component 13 which is secured to the mounting face 12A. As shown in FIG. 6, the bit mounting component 13 is in the form of a plate-like square configuration corresponding to the mounting wall 12A and is made of tougher material than cemented carbide constructing the shank 12, such as steel or sintered metal, capable of machining. The bit mounting component 13 is formed with a portion of a bit mounting seat 14 according to the configuration of a bit 15 mounted thereto by removing a wall portion including a corner toward the thickness of the bit mounting component 13 so as to form an opening 13A.

As in the prior art cutting tool, the bit 15 is formed in a plate-like positive type bit having substantially an equilateral triangle shape in plane viewed. A plurality of cutting edges 15C are formed at the intersections between the upper face 15A used for a cutting face and side faces 15B used for flank faces.

The opening 13A is in the shape of an equilateral triangle in plane view according to the configuration of the bit 15. The opening 13A is defined by two faces 13A and 13B having an angle set at 60° therebetween.

The bit mounting component 13 is soldered to the front end of the shank 12 such that the lower face 13D is adhered to the mounting wall 12A and the opening 13A is directed toward the front end of the tool body 11. The thickness of the bit mounting component 13 is set in the range such that the upper face 13E includes the axis O of the tool body 11 when the bit mounting component 13 is fixed to the mounting wall 12A. The side faces 13B and 13C are employed as mounting walls of the bit mounting seat 14 and are formed in inclined faces downslope toward the center of the opening 13A according to the clearance angle of the side faces 15B of the bit 15.

The bit mounting seat 14 is defined by the side faces 13B and 13C extending along the thickness of the bit mounting component 13 and a portion of the mounting wall 12A surrounded by the side faces 13B and 13C. That is, the portion of the mounting wall 12A surrounded by the side faces 13B and 13C is employed as a bottom wall 14A of the bit mounting seat 14 and is recessed from the upper face 13E of the bit mounting component 13; and the side faces 13B and 13C are employed as side walls 14B and 14C and rise from the bottom wall 14A and connected to the upper face 13E of the bit mounting component 13. The bit 15 is located on the bit mounting seat 14 such that the lower face 15D thereof contacts the bottom wall 14A, and two of the side faces 15B contact the side walls 14B and 14C, and are secured to the bit mounting seat 14 by the clamping mechanism 16. The bit 15 is positioned on the bit mounting seat 14 such that the cutting edge 15C is perpendicular to the axis O and projects slightly toward the front from the front end face of the shank 12 and the bit mounting component 13. The clamping mechanism 16 consists of a clamping bolt 16A secured to the bit mounting component 13 and a clamping piece 16B having a clamping claw 16C at the front end thereof, so that the upper face 15A is pressed by the clamping claw 16C and the lower face 15D opposite to the upper face 5A is adhered to the bottom wall 14A so as to secure the bit 15 to the bit mounting seat 14.

In the cutting tool constructed as above, the cutting force exerted on the bit 15 is received by the bottom wall 14A, i.e., the mounting wall 12A formed along the lengthwise direction of the shank 12 made of cemented carbide. Therefore, in the above cutting tool, the cutting force does not act to shear the soldered layer between the shank 12 and the bit mounting component 13, so that high resistance against the cutting force can be obtained and separation of the bit mounting component 13 and the shank 12 can be prevented.

Furthermore, in the cutting tool, since the shank 12 made of cemented carbide extends as the bottom wall 12A as far as vicinity of the cutting edge 15C and supports the bit 15, high rigidity of the tool body 12 is ensured, and the damping capacity of the tool body 11 is increased; therefore vibration and chatter of the cutting tool can be effectively prevented.

Moreover, in the cutting tool of the above embodiment, since the bit mounting seat 14 is constructed with a plane face of the bottom wall 14A of the shank 12 and side walls 14B and 14C which are formed by hollowing out a portion of the bit mounting component 13 toward the direction of the thickness thereof, the bit mounting seat 14 can be easily formed. That is, since the bit mounting seat 14 can be formed by simple machining, and the depth of the bit mounting seat 14 can be easily chosen by the choosing of the thickness of the bit mounting component 13, and the machining procession can be simplified.

Figure 7:
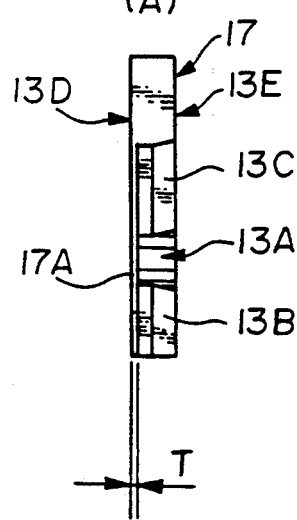
FIG. 7 illustrates another variation of a bit mounting component of the first embodiment, wherein (A) is a side view, and (B) is a plan view.
Figure 7:
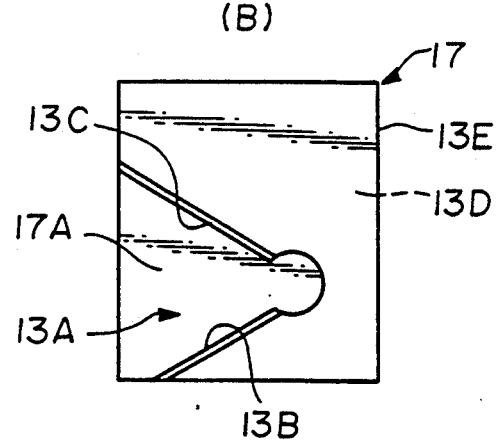
Figure 8:
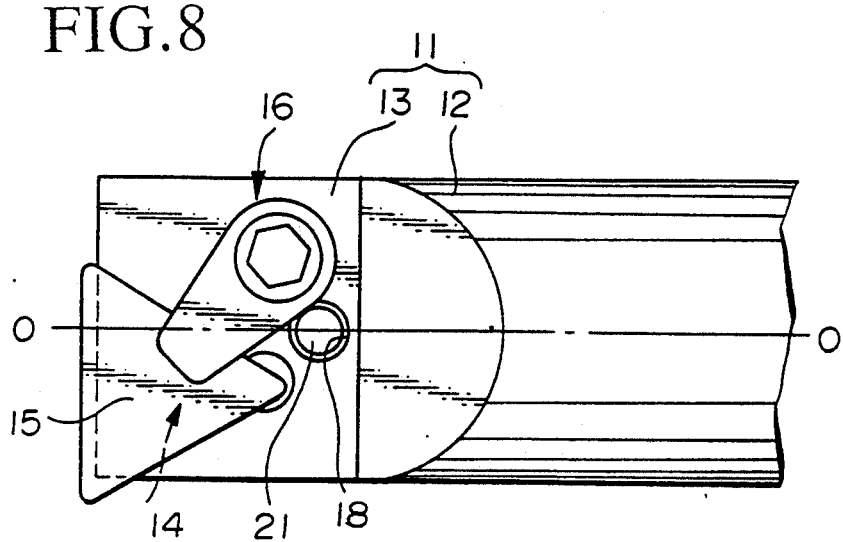
FIG. 8 is a plan view of the front end of a variation of a cutting tool of the first embodiment.
Figure 9:
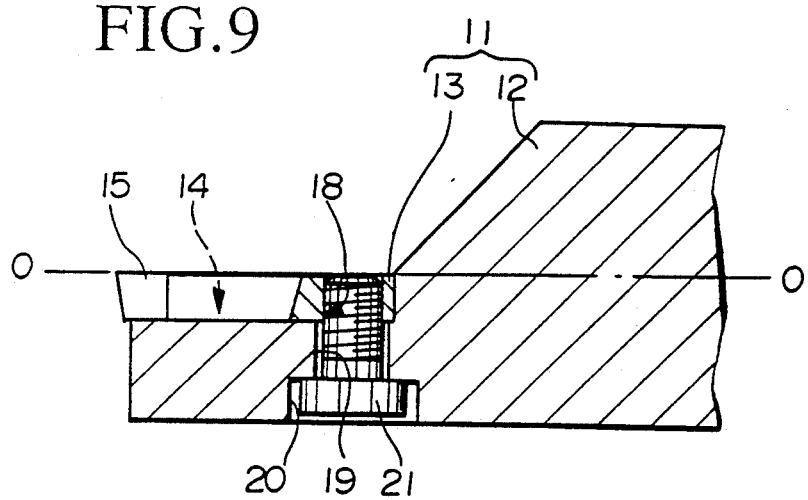
FIG. 9 is a side view of the front end of the cutting tool in FIG. 8.
Figure 10:
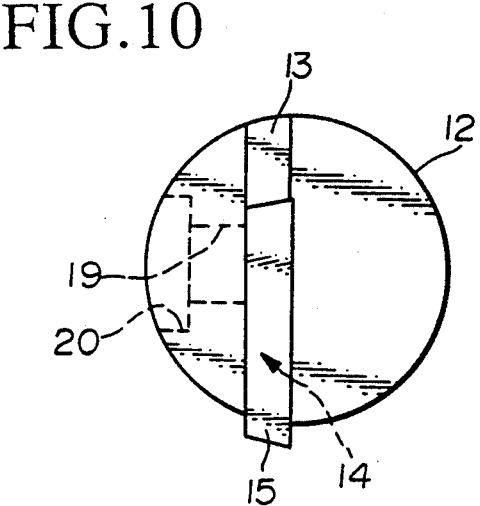
FIG. 10 is an end view of the front end of the cutting tool in FIG. 8 along the direction of the axis O.
Figure 11:
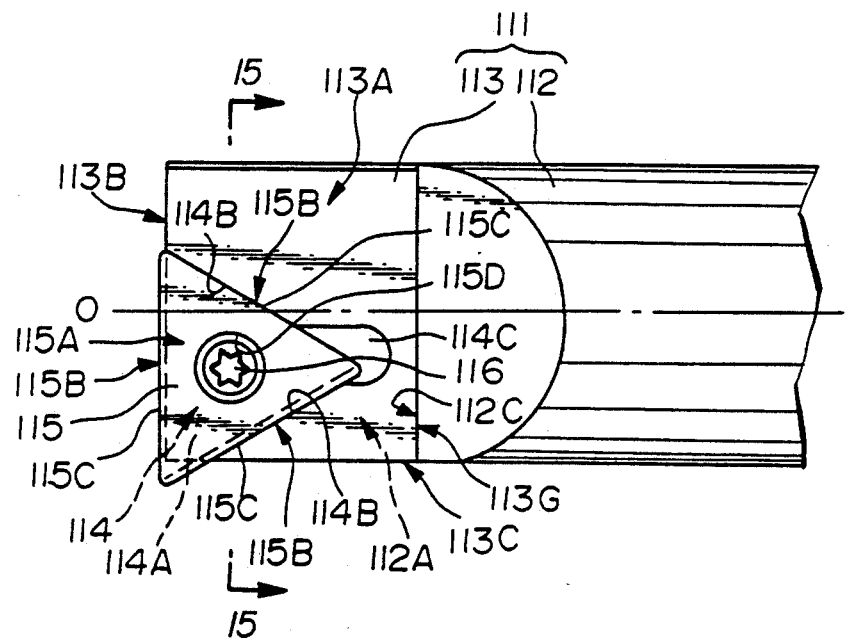
FIG. 11 is a plan view of the front end of a cutting tool according to the second embodiment of the invention.
Figure 12:
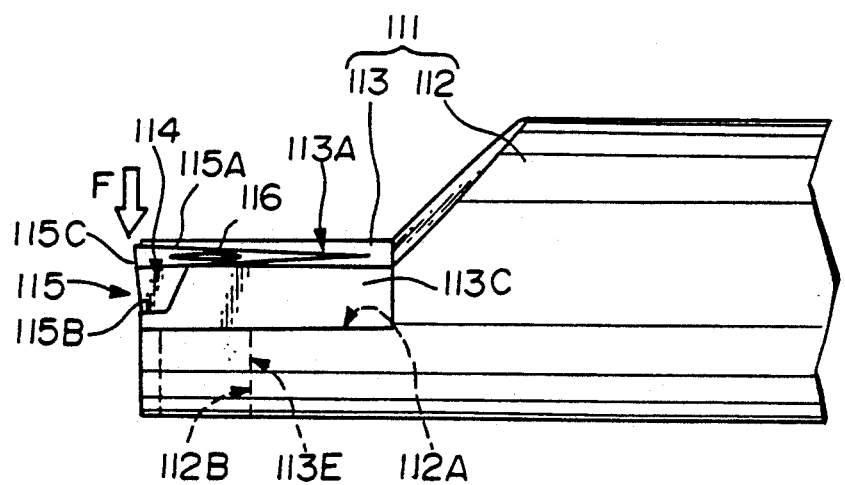
FIG. 12 is a side view as viewed obliquely from an upper location of the upper face 113A of a bit mounting component 113.
Figure 13:
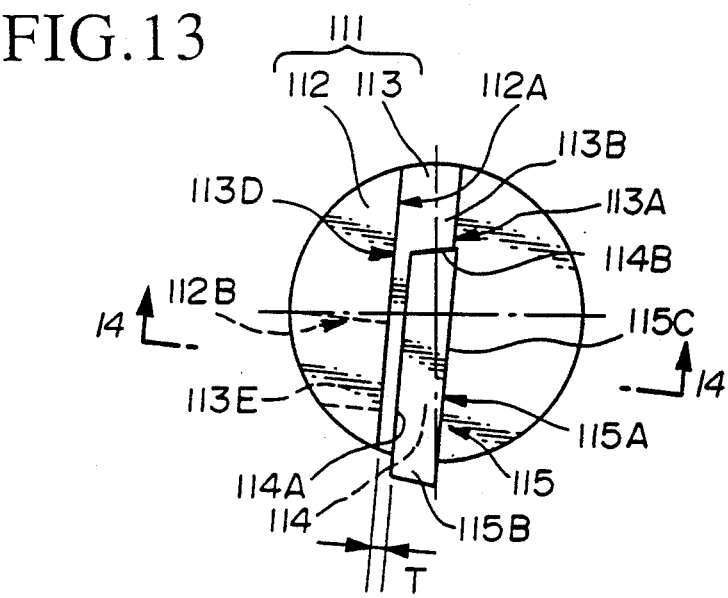
FIG. 13 is an end view of the front end of the cutting tool in FIG. 11 along the direction of the axis O.
Figure 14:
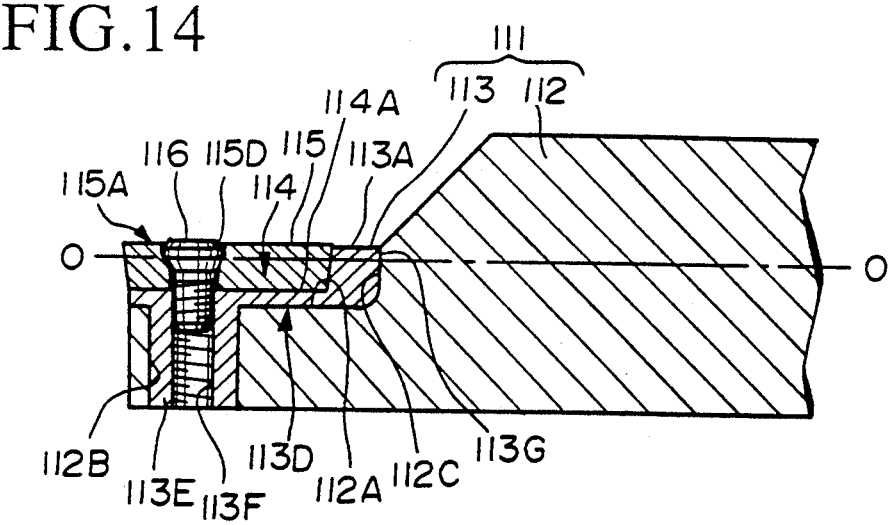
FIG. 14 is a cross-sectional view taken along the line 14—14 in FIG. 13.
Figure 15:
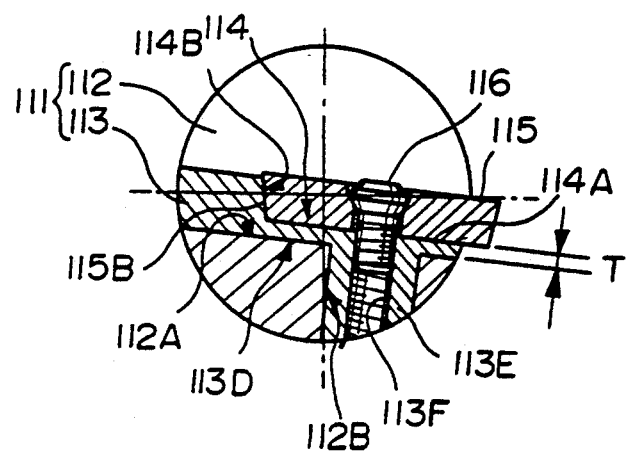
FIG. 15 is a cross-sectional view taken along the line 15—15 in FIG. 11.

FIG. 7 illustrates a variation of the bit mounting component of the first embodiment. The same numerals are applied to the same components in the above bit mounting component 13 in FIG. 6 to avoid repetition of the description. In the bit mounting component 17, a bottom plate portion 17A is uniformly formed with the bit mounting component 17 at a portion surrounded by the side faces 13B and 13C which are employed as side walls 14B and 14C of the bit mounting seat 14, so that the upper face of the bottom plate portion 17A is employed as the bottom wall 14A of the bit mounting seat 14.

The bit mounting component constructed as above is soldered to the shank 12. The cutting tool having the bit mounting component 17 can obtain the same advantages as the aforementioned cutting tool.

Furthermore, since the whole surface of the lower face 13D of the bit mounting component 17 is soldered to the shank 12, the area of the soldering is large, so that the bit mounting component 17 can be rigidity fixed to the shank compared to the aforementioned bit mounting component 13. Moreover, since a soldering layer does not exist between the bottom wall 14A and the side walls 14B and 14C, the bit mounting seat 14 can be formed precisely.

The thickness T of the bottom plate portion 17A is preferably set in the range of 0.1 mm to 1.0 mm. When the thickness T is less than 0.1 mm, machining of the bottom plate portion will be difficult. On the contrary, when the thickness T is more than 1.0 mm, the thickness of the front end of the shank will be too large, resulting in the decrease of rigidity of the tool body.

In the description of the first embodiment, although the bit mounting component 13 or 17 is soldered to the shank 12, the present invention is not so limited. That is, the bit mounting component 13 can be secured to the shank 12 by means of a screw hole 18 formed in the bit mounting component 13, a through hole 19, a spot facing 20 formed in the shank 12, and a screw 21 secured in the tapped hole 18 for pulling the bit mounting component 13 toward the mounting wall 12A. In this construction, since the soldering layer does not exist, precise positioning of the bit mounting seat 14 can be carried out.

As mentioned above, in the cutting tool having the above structure, singe the mounting wall secures the bit mounting component along the direction perpendicular to the direction of the cutting force, the cutting forge does not act to shear the soldered layer between the shank and the bit mounting component, so that high resistance against the cutting force can be obtained and separation of the shank and the bit mounting component can be prevented.

Furthermore, in the cutting tool, singe the shank made of cemented carbide extends as far as the vicinity of the cutting edge, high rigidity of the tool body is ensured, and the damping capacity of the tool body is increased, so that vibration and chatter of the cutting tool can be effectively prevented.

FIGS. 11 through 15 illustrate a cutting tool according to the second embodiment of the invention.

As shown in the Figures, a tool body 111 consists of a shank 112 and a bit mounting component 113. The bit mounting component 113 is formed with a bit mounting seat 114 to which a bit 115 is secured.

The shank 112 is made of cemented carbide and is formed substantially in the shape of a cylinder. The front end of the shank 112 is formed with a square-shaped mounting wall 112A for the bit mounting component 113 by removing an upper portion of the front end thereof from a plane face under and parallel with respect to the axis O of the tool body 111. The shank 112 is formed with a vertical wall rising up from the mounting wall 112A and an inclined wall downslope toward the front end of the shank 112 and connected to the radially outer face of the shank 112 (see FIG. 12).

The bit mounting component 113 is in the form of a plate-like square configuration corresponding to the mounting wall 112A and is made of a tougher material than cemented carbide composing the shank 112, such as steel or sintered metal, which is capable of machining. A bit mounting seat 114 is formed at the upper face 113A of the bit mounting component 113. The bit mounting seat 114 is recessed from the upper face 113A and is opened toward the front face 113B and a side face 113C of the bit mounting component 113. As in the first embodiment, a bit 115 mounted to the bit mounting seat 114 is formed in a plate-like positive type bit having substantially an equilateral triangle shape in plane view. A plurality of cutting edges 115C are formed at the intersections between the upper face 115A used for a cutting face and the side faces 115B used for flank faces. A through hole 115D into which is inserted a clamping screw 116 is formed at the center of the upper face 115A of the bit 115.

The bottom wall 114A of the bit mounting seat 114 is in the shape of an equilateral triangle in plane view according to the configuration of the bit 115. The angle between the side walls 114B rising from the bottom wall 114A and connected to the upper face 113A is set at 60°. The side walls 114B are formed into an inclined faces downslope toward the center of the bit mounting seat 114 according to the clearance angle of the side faces 115B of the bit 115. The bit 115 is positioned on the bit mounting seat 114 such that the cutting edge 115C is perpendicular to the axis O and projects slightly toward the front from the front side face 113B of the bit mounting component 113. The numeral 114C indicates a relief for a corner of the bit 15.

The lower face 113D of the bit mounting component 113 is formed with a protrusion 113E projecting in the direction perpendicular to the lower face 113D. The protrusion 113E is in the form of a cylinder. The mounting wall 112A is formed with a recess 112B having a circular cross section and concaved in the direction perpendicular to the mounting wall 112A. The recess 112B fits to the protrusion 113E when the bit mounting component 113 is fixed to the mounting wall 112A.

The center of the protrusion 113E is slightly displaced to the rear end of the tool body 111 with respect to the center of the through hole 115D of the bit 115 which is mounted to the bit mounting seat 114. The recess 112B is opened to the radially peripheral surface of the shank 112. The end face of the protrusion 113E is formed with an arcuate face so that the end face is smoothly connected to the peripheral surface of the shank 112.

The protrusion 113E is formed with a tapped hole 113F opening at the centers of the bottom wall 114A of the bit mounting seat 114 and the end face of the protrusion 113E.

The bit mounting component 113 is soldered to the front end of the shank 112 such that the protrusion 113E is fitted into the recess 112B, the rear side face 113G contacts the side wall 112C rising from the mounting wall 112A of the shank 112, and the lower face 113D adheres to the mounting wall 112A.

The bit 115 is located on the bit mounting seat 114 such that the lower face 115D contacts the bottom wall 114A, and two of the side faces 115B contact the side walls 114B and 114C. The bit 115 is secured to the bit mounting seat 114 by the clamping screw 116 inserted in the through hole 115D and screwed to the tapped hole 113F.

In the cutting tool constructed as above, the cutting force exerted on the bit 115 is received by the bottom wall 114A, i.e., the mounting wall 112A formed along the lengthwise direction of the shank 112 made of cemented carbide. Therefore, in the above cutting tool as well, the cutting force does not act to shear the soldered layer between the shank 112 and the bit mounting component 113, so that high strength against the cutting force can be obtained and separation of the shank 112 and the bit mounting component 113 can be prevented.

Furthermore, in the cutting tool as well, since the shank 112 made of cemented carbide extends as the bottom wall 112A as far as the vicinity of the cutting edge 115C and supports the bit 115, high rigidity of the tool body 112 is ensured, and the damping capacity of the tool body 111 is increased, so that vibration and chatter of the cutting tool can be efficiently prevented.

Moreover, in the above cutting tool, bit mounting component 113 is fixed to the shank 112 such that the protrusion 113E of the bit mounting component 113 is fitted to the recess 112B formed on the mounting wall 112A. Therefore, the bit mounting component 113 is more rigidly secured to the shank 112, and high resistance against the cutting force can be obtained. In addition, since the protrusion 113E is fitted to the recess 112B, the bit mounting component 113 can be precisely positioned, and the cutting edge 115A can also be precisely positioned.

Furthermore, in the cutting tool, since the rear side face 113G of the bit mounting component 113 contacts the side wall 112C of the shank 112, slip of the bit mounting component 113 is prevented.

Moreover, in the cutting tool, since the protrusion 113E is formed on the bit mounting component 113, the tapped hole 113F can be formed in the protrusion 113E, so that machining of the shank 112 made of cemented carbide is not required, and the so-called screw-on type cutting tool can be easily constructed.

That is, when the bit mounting component 113 has plate-like shape and the mounting face 112A extends along the lengthwise direction of the tool body 111, in order to secure the bit 115, the thickness of the bit mounting component 113 must be thick or else the tapped hole 113F must extend to the shank 112. However, increase of the thickness of the bit mounting component 113 results in decrease of the thickness behind the mounting wall 112A of the shank 112, and this causes decrease in the rigidity of the tool body 111. Furthermore, it is difficult to machine a tapped hole in the shank 12 made of cemented carbide.

However, in the cutting tool constructed as above, since the tapped hole 113F is formed in the protrusion 113E, the thickness of the bit mounting component 113 can be small, and the rigidity of the tool body 111 can be ensured.

Furthermore, in the cutting tool as above, since the center of the protrusion 113E is displace toward the rear end of the cutting tool 111 with respect to the center of the through hole 115D of the bit 115, when the bit 115 is secured to the bit mounting seat 114, the side face 115B is pushed to the side wall 114B of the bit mounting seat 114, so that the bit 115 is more rigidly secured to the bit mounting seat 114.

Figure 16:
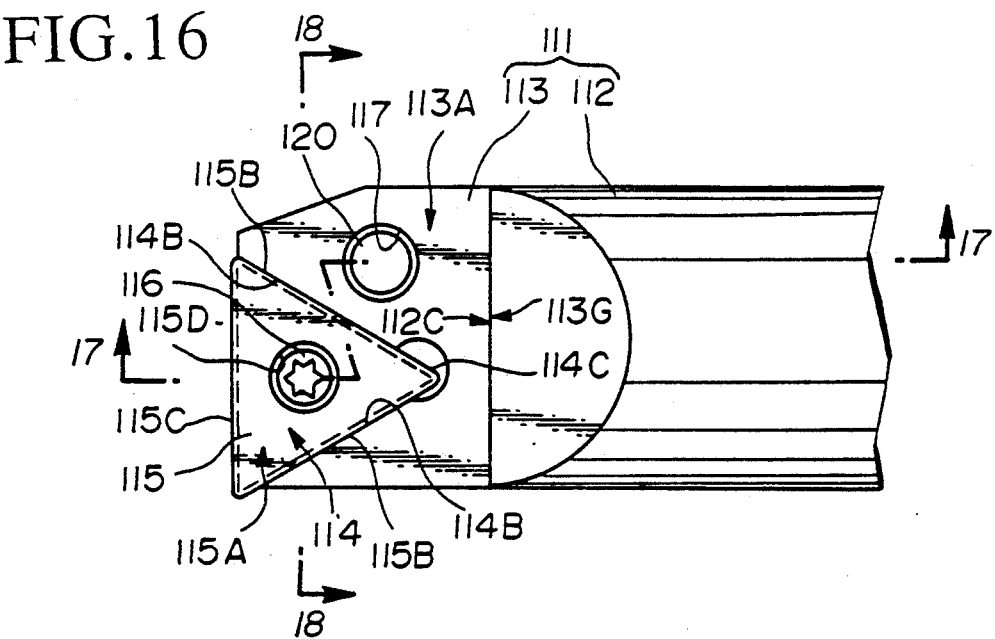
FIG. 16 is a plan view of the front end of a variation of the cutting tool in FIG. 11.
Figure 17:
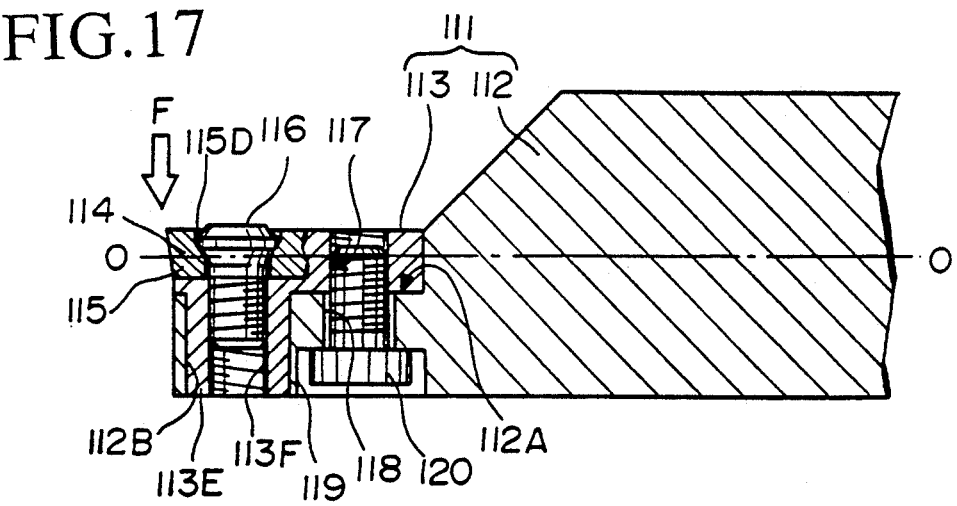
FIG. 17 is a cross-sectional view taken along the line 17—17 in FIG. 16.
Figure 18:
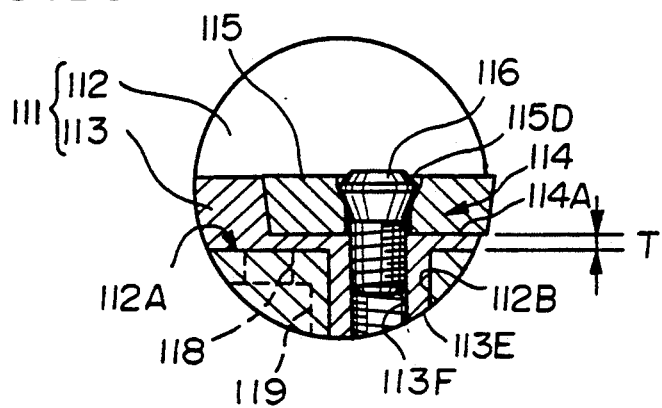
FIG. 18 is a cross-sectional view taken along the line 18—18 in FIG. 16.

FIGS. 16 and 18 illustrate a variation of the cutting tool of the second embodiment. The same numerals are applied to the same components in the above cutting tool to avoid repetition of the description.

The cutting tool is different from the above embodiment in that the bit mounting component 113 is secured to the mounting wall 112A by means of a tapped hole 117 formed in the bit mounting component 113, and a through hole 118 and a back facing 119 formed in the shank 112 coaxially, and a clamping screw 120 is inserted in the through hole 118 and the back facing 119 and screwed to the tapped hole to pull the bit mounting component 113 to the mounting wall 112A.

In the cutting tool as constructed as above, since the bit mounting component 113 has a plate-like shape and the mounting wall 112A extends along the lengthwise direction of the tool body 111, and the bit mounting component 113 is secured to the mounting wall 112A inserting the protrusion 113E of the bit mounting component 113 into the recess 112B of the shank 112, the same advantage are obtained as in the above embodiment.

Furthermore, since the bit mounting component 113 is secured by the clamping screw 120, the bit mounting component 113 can be easily secured and removed from the mounting wall 112A. Therefore, when the bit mounting component 113 is damaged, the shank 112 can be used continuously by changing the bit mounting component 113. Moreover, by preparing many kinds of bit mounting components 113, many kind of bits 115 can be used for a cutting tool.

In the above embodiment, since the bit mounting seat 114 is recessed from the upper face 113A of the bit mounting component 113, the thickness T between the bottom wall 114A and the lower face 113D is not sufficient.

The thickness T is preferably set in the range of 0.1 mm to 1.0 mm. When the thickness T is less than 0.1 mm, machining of the bit mounting component 113 will be difficult. In contrast, when the thickness T is greater than 1.0 mm, the thickness of the front end of the shank 112 will be too small.

As mentioned above, in the cutting tool having the above structure, since the mounting wall secures the bit mounting component along the direction perpendicular to the direction of the cutting force, the cutting force does not act to shear the soldered layer between the shank and the bit mounting component, so that high resistance against the cutting force can be obtained and separation of the shank and the bit mounting component can be prevented.

Furthermore, in the cutting tool, since the shank made of cemented carbide extends as far as the vicinity of the cutting edge, high rigidity of the tool body is ensured, and the damping capacity of the tool body is increased, so that vibration and chatter of the cutting tool can be effectively prevented.

Moreover, in the cutting tool, since the protrusion of the bit mounting component is fitted in the recess of the shank, the bit mounting component can be rigidly secured to the shank; additionally, by forming a tapping hole in the protrusion, so that machining of the shank made of cemented carbide is not required, and the so-called screw-on type cutting tool can be easily constructed and the rigidity of the front end of the tool body can be ensured.

FIGS. 19 through 22 illustrate a cutting tool according to the third embodiment of the invention.

As shown in the Figures, a tool body 211 consists of a shank 212 and a bit mounting component 213. The bit mounting component 213 is formed with a bit mounting seat 214 to which a bit 215 is secured.

The shank 212 is made of cemented carbide and is formed in substantially the shape of a cylinder. At the front end of the shank 212, the upper wall portion of the end from a plane face under and parallel with respect to the axis O of the tool body 211 is removed, and further recessed from the plane face so as to form an L-shaped portion in a plane view.

The recessed portion is in the shape of square and is employed as a mounting wall 212A for mounting a bit mounting component 213. The L-shaped portion is defined by the mounting wall 212A, a side wall 212B and a rear side wall 212C perpendicular to each other. At the rear side of the rear side wall 212C, an inclined wall downslope toward the front end of the shank 212 and connected to the radially outer face of the shank 212 is formed.

At the intersection of the side wall 212B and the rear side wall 212C, a concave wall having a 1/4 arc is formed. The mounting wall 212A, the side wall 212B and the rear side wall 212C are formed by means of electro-spark machining to obtain high precision.

The bit mounting component 213 is in the form of a plate-like square configuration corresponding to the mounting wall 212A and is made of tougher material than cemented carbide composing the shank 212, such as steel or sintered metal, capable of machining. A bit mounting seat 214 is formed at the upper face 213A of the bit mounting component 213.

The bit mounting component 213 is mounted to the front end of the shank 212 contacting the lower face 213B thereof with the mounting wall 212A in the condition in which the side face 213 contacts the side wall 212B and the rear side face 213D contacts the rear side wall 212C. The intersection of the side face 213C and the rear side face 213D is formed with a chamfer 213E to release the corner of the bit mounting component 213.

The construction of the bit 215 is same as the bit 115 in the second embodiment; the bit 215 has a plurality of cutting edges 215C formed at the intersections between the upper face 215A and the side faces 215B and a through hole 215D. The construction of the bit mounting seat 214 is the same as in the second embodiment; the seat 214 has a bottom wall 214A, side walls 214B, and a relief 214C.

Figure 20:
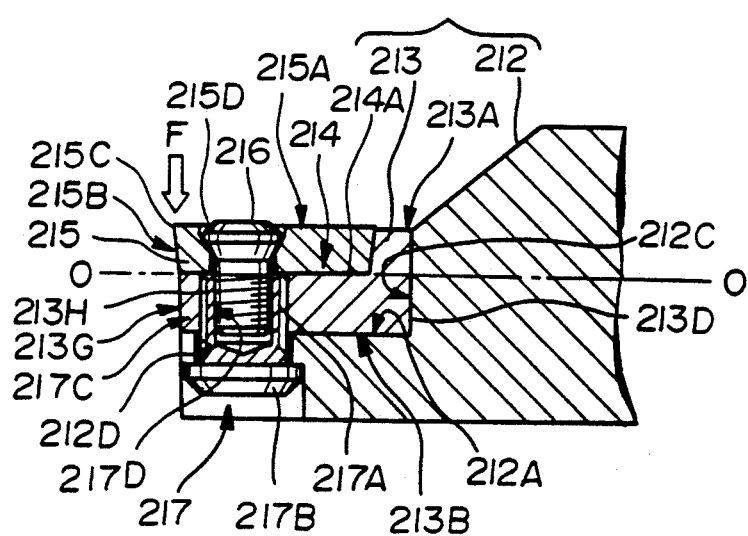
FIG. 20 is a cross-sectional view taken along the line 20—20 in FIG. 19.
Figure 21:
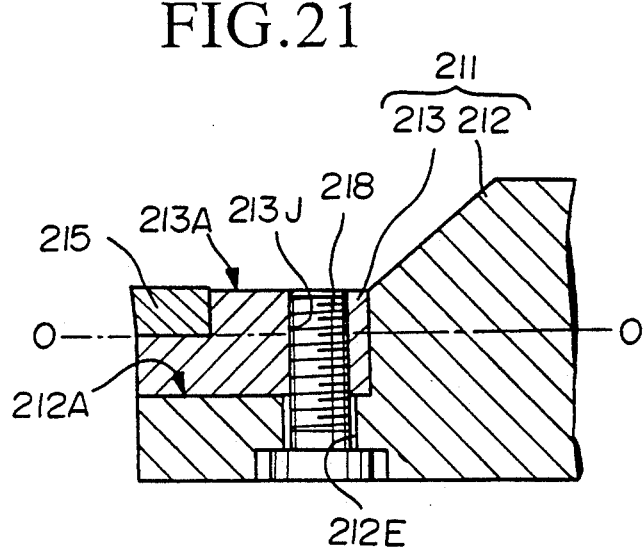
FIG. 21 is a cross-sectional view taken along the line 21—21 in FIG. 19.
Figure 22:
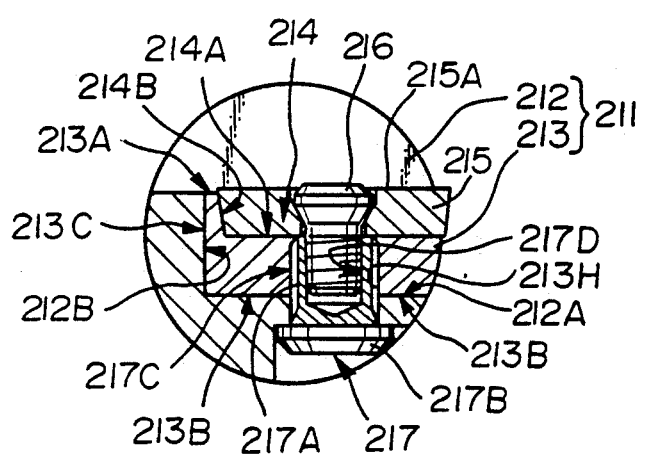
FIG. 22 is a cross-sectional view taken along the line 22—22 in FIG. 19.

As shown in FIG. 20, the bit mounting component 213 is formed with a tapped hole 213H coaxially with the through hole 215D of the bit 215 mounted to the bit mounting seat 214. The shank 212 is formed with a through hole 212H coaxially with the through hole 215D.

Figure 19:
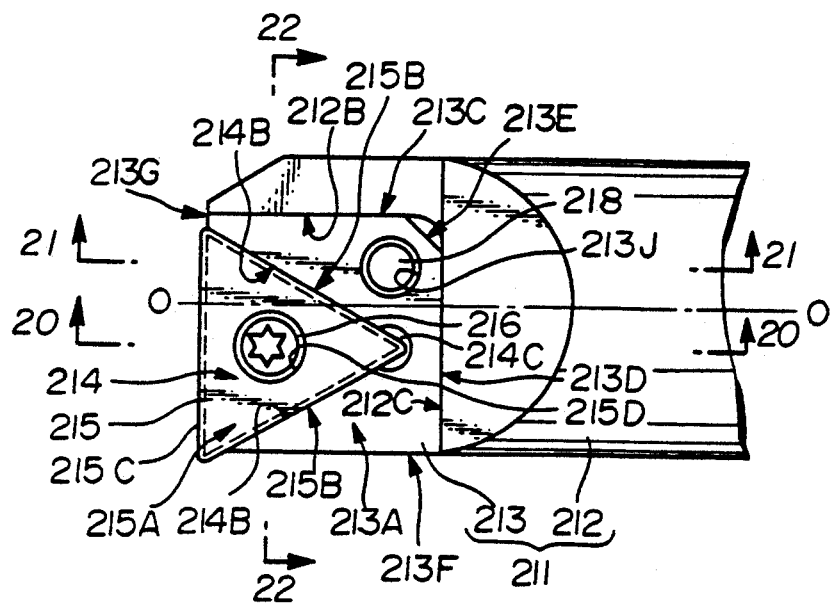
FIG. 19 is a plan view of the front end of a cutting tool according to the third embodiment of the invention.

As shown in FIGS. 19 and 20, the bit mounting component 213 is formed with a tapped hole 213J adjacent the chamfer 213E. The tapped hole 213J perpendicularly penetrates the bit mounting component 213. The shank 212 is formed with a through hole 212E coaxially with the tapped hole 213J.

A clamping screw 217 is inserted in the through hole 212D and screwed to the tapped hole 213H of the bit mounting component 213; a clamping screw 218 is inserted in the through hole 212E and screwed to the tapped hole 213J, so that the bit mounting component 213 is secured to the shank 212 adhering to the lower face 213B to the mounting wall 212A.

The clamping screw 217 consists of a pin-shaped shank portion 217A and a disk-shaped head 217B. The shank portion 212A is formed with a hole coaxially, and the inner wall of the hole is formed with a female screw 217D to which the clamping screw 216 is secured. The radially peripheral wall of the shank portion 212A is formed with a male screw 217C which is secured to the tapped hole 213H. The length of the body 217A is slightly less than the total length of the tapped hole 213H and the length of the through hole 212D, so that the end of the body 217A does not project from the bottom wall 214A of the bit mounting seat 214.

The clamping screw 218 is chosen from well-known screws, such as a slotted flat head small screw, flat head small screw and a hexagon socket head cap screw.

The bit 215 is located on the bit mounting seat 214 such that the side faces 215B contact the side walls 214B and 214C. The bit 215 is secured to the bit mounting seat 214 by the clamping screw 216 inserted in the through hole 215D and screwed to the female screw 217D of the clamping screw 217.

In the cutting tool constructed as above, the same advantage as in the second embodiment can be obtained. That is, in the cutting tool, cutting force exerted on the bit 215 is received by the bottom wall 214A of the bit mounting seat 214, and high resistance against the cutting force can be obtained and separation of the shank 212 and the bit mounting component 213 can be prevented; the high rigidity of the tool body 212 is ensured, and the damping capacity of the tool body 211 is increased, so that vibration and chatter of the cutting tool can be efficiently prevented.

Specifically, in the cutting tool, since the front end of the shank 212 is formed with the L-shaped portion for mounting the bit mounting component 213, the bit mounting component 213 is supported by the bottom wall 212A, side wall 212B, and rear side wall 212C. Therefore, the bit mounting component 213 can be rigidly secured and does not slip even though lateral or axial force is exerted on the bit 215, so that the slip of the bit 215 can be prevented and the bit 215 can be precisely positioned, and precision of machining is ensured.

Furthermore, in the above cutting tool, since the clamping screw 217 for securing the bit mounting component 213 to the shank 212 is secured to the female screw 217D of the clamping screw 216 for securing the bit 215 to the bit mounting seat 214, machining of the shank made of cemented carbide and the bit mounting component 213 is simplified and the Small space of the front end of the shank 212 can be effectively used, so that a so-called screw-on type cutting tool can be easily constructed and the rigidity of the front end of the tool body can be ensured. In addition, the bit mounting component 213 is pressed by the bit 215 and the shank 212, the bit mounting component 213 is more rigidly fixed to the shank 212.

In order to avoid the relaxation of the clamping screws 216 and 217 caused by vibration produced during cutting operation, left hand tapping processing should be carried out to one of the clamping screws 216 and 217.

Moreover, in the above cutting tool, since the bit mounting component 213 is secured by two clamping screws 217 and 218, the bit mounting component 213 is rigidly fixed to the shank 212.

Figure 23:
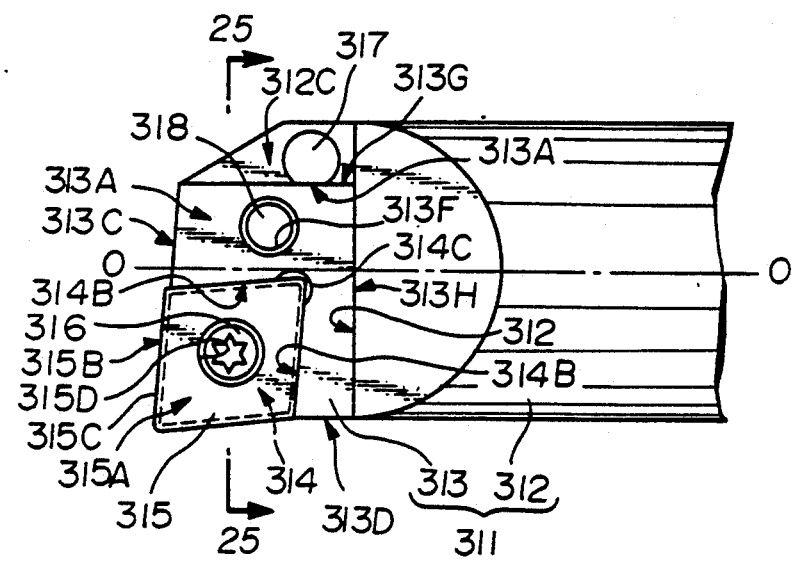
FIG. 23 is a plan view of the front end of a cutting tool according to the fourth embodiment of the invention.
Figure 24:
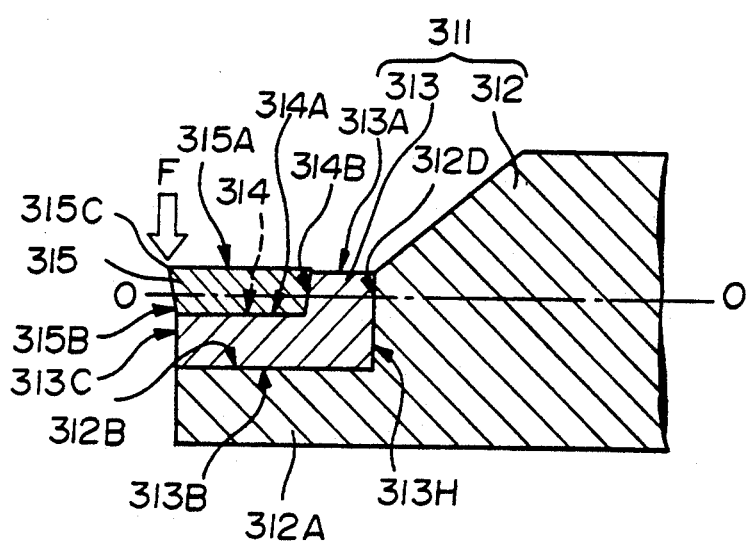
FIG. 24 is a side view of the front end of the cutting tool in FIG. 23.
Figure 25:
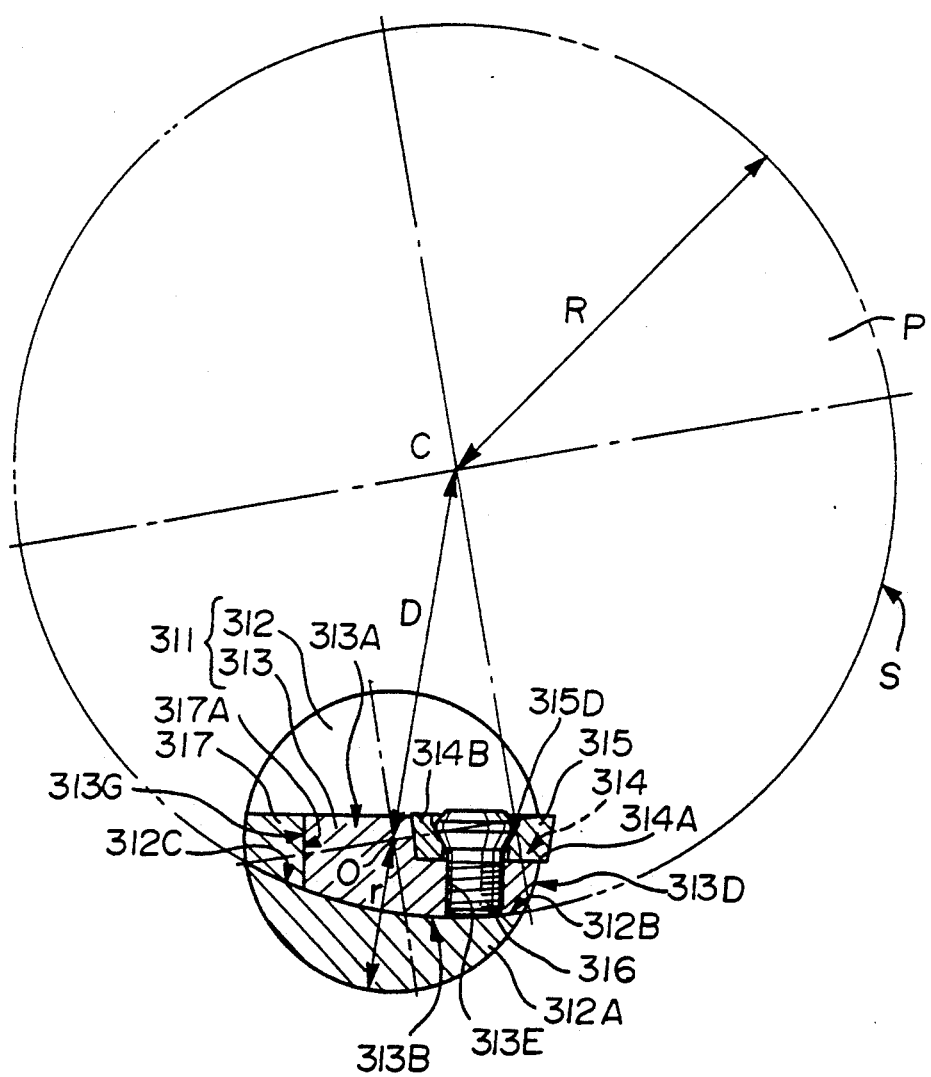
FIG. 25 is a cross-sectional view taken along the line 25—25 in FIG. 23.

FIGS. 23 through 25 illustrate a cutting tool according to the fourth embodiment of the invention.

As shown in the Figures, a tool body 311 consists of a shank 312 and a bit mounting component 313. The bit mounting component 313 is formed with a bit mounting seat 314 to which a bit 315 is secured.

The shank 312 is made of cemented carbide and is formed in substantially the shape of a cylinder of diameter r (see FIG. 25).

At the front end 312A of the shank 312, as shown FIG. 25, the upper wall portion thereof including the axis O of the tool body 311 is removed so as to form a arcuately concave face. That is, assuming a circular cylinder P having a diameter R, an axis C separated from the axis O at a distance D and parallel to the axis O, the arcuately concave face corresponds to the radially outer surface S of the circular cylinder P. For this construction, the front end 312A of the tool body 311 is in the shape of a plate having a cross-section in the shape of a crescent. The diameter R of the cylinder P is set in the range which is more than the distance D between the axes C and O and is less than the total of the distance D and the diameter r.

In the embodiment, the acuately concave face which extends toward the lengthwise direction of the tool body 311 is employed as a mounting wall 312B for the bit mounting component 313. A side end 312C (upper side in FIG. 23) of the mounting wall 312B is in the form of a trapezoid in plane view.

At the rear side of the mounting wall 312A, there are formed a rear side wall 312D perpendicularly rising from the mounting wall 312B and an inclined wall stemming from the upper end of the rear side wall 312D and downslope toward the front end of the shank 312 and connected to the radially outer face of the shank 312.

The bit mounting component 313 mounted to the mounting wall 312B is in the form of a plate-like rectangular configuration corresponding to the mounting wall 312B and is made of tougher material than cemented carbide composing the shank 312, such as steel or sintered metal, capable of machining. The upper face 313A of the bit mounting component 313 is formed in a plane face, the lower face 313B of the bit mounting component 313 is formed in a circular convex face having a diameter R which is identical to the diameter R of the radially outer surface S of the cylinder P according to the concave mounting wall 312B. For this construction, the lower face 313B can be employed as a mounting face 313B adhering to the mounting wall 312B of the shank 312.

Furthermore, the upper face 313A of the bit mounting component 313 is inclined with respect the line segment connecting the center C and the center D, so that the thickness of the bit mounting component 313 increase toward the right side end from the left side end in FIG. 25.

The bit 315 is formed as a positive type bit having a substantially a parallelogram shape viewed in plane. A plurality of cutting edges 315C are formed at the intersections between the upper face 315A and side faces 315B. The bit 315 is formed with a through hole 315 into which is inserted a clamping screw 316 at the center of the upper face 315A.

The bit mounting seat 314 is disposed at a corner of the bit mounting component 313, and recessed from the upper face 313A of the bit mounting component 313. The bit mounting seat 314 is opened to the upper face 313A, the front end face 313C and a side face 313D of the bit mounting component 313. The bottom wall 314A of the bit mounting seat 314 is formed in a parallelogram shape according to the configuration of the bit 315.

The bit mounting seat 314 has side faces 314B downsloped toward the center of the mounting seat 314 according to the clearance angle of the side faces 315B of the bit 315, and the side faces 314B are connected to the upper face 313A. Numeral 314C indicates a relief for the corner of the bit 315 mounted to the bit mounting seat 314.

The bit mounting component 313 is formed with a tapped hole 313E opened to the bottom wall 314A and the lower face of the bit mounting component 313 perpendicularly to the bottom wall 314A and coaxially to the through hole 315D of the bit 315 mounted to the bit mounting seat 314.

The front end 312A of the bit mounting component 313 is formed with a tapping through hole 313F perpendicular to the upper face 313A. The shank 312 is formed with a through hole (not shown) coaxially to the tapping hole 313F. A stopper piece 317 is attached to the side end 312C of the mounting wall 312B. The stopper piece 317 is in the form of a pin formed with a flat face 317A at the radially outer surface thereof. The stopper piece 317 is rigidly inserted in a hole (not shown) formed on the side end 312C perpendicularly to the upper face 313A and arranged such that the flat face 317A is directed toward the axis O. The flat face 317A is adhered to the side face 313G of the bit mounting component 313 which is secured to the mounting wall 312B.

The bit mounting component 313 is secured to the front end 312A of the shank 312 by a clamping screw 318 inserted in the through hole of the shank 312 and secured to the tapping hole 313F in the condition in which the mounting face 313B contacts the mounting wall 312B, the rear side face 313H contacts the rear side wall 312D and the side face 313G contacts the flat face 317A of the stopper piece 317. The bit 315 is located on the bit mounting seat 314 such that the side faces 315B thereof contact the side walls 314B of the bit mounting wall, and are secured to the bit mounting seat 314 by the clamping screw 316 inserted in the through hole 315D and secured to the tapping hole 313E of the bit mounting component 313.

In the cutting tool constructed as above, the same advantage as in the second embodiment can be obtained. That is, in the cutting tool, cutting force exerted on the bit 315 is received by the bottom wall 314A of the bit mounting seat 314, and high resistance against the cutting force can be obtained and separation of the shank 312 and the bit mounting component 313 can be prevented; the high rigidity of the shank 312 is ensured, and the damping capacity of the tool body 311 is increased, so that vibration and chatter of the cutting tool can be effectively prevented.

Specifically, in the cutting tool, since the mounting wall 312B is in the shape of a concave face and the mounting face 313B of the bit mounting component 313 is in the shape of a convex #ace corresponds to the concave face, the bit mounting component 313 is engaged with the bottom wall 312B in the lateral direction. Therefore, the bit mounting component 313 can be rigidly secured and does not slip even though lateral force is exerted, so that the slip of the bit mounting component 313 can be prevented and the bit 315 can be precisely positioned.

Furthermore, in the above cutting tool, since the thickness of the bit mounting component 313 increase toward the right side end from the left side end in FIG. 25 and the tapping hole 313E is formed at the right side end having a large thickness, the depth of the tapping hole 313E can be effectively ensured without machining of the shank 312 made of cemented carbide. The mounting wall 312B can be easily formed by means of a grinding wheel having diameter R.

In addition, in the above cutting tool, since the side faces 313G and 313H are supported by the flat face 317A of the stopper piece 317 and the rear side wall 312D, the bit mounting component 313 can be rigidly secured even though the lateral or axial force is exerted.

The diameter R of the mounting wall 312B is chosen according to the diameter r of the shank 312. The ratio r/R is preferably set in the range of 0.2 to 0.5. When the ratio r/R is more than 0.5, the mounting wall 312B will be nearly flat, which is not desirable. When the ratio r/R is less than 0.2, the area of the mounting wall 312B will not be sufficient and the thickness of the side end of the mounting wall 312B will be less.

Figure 26:
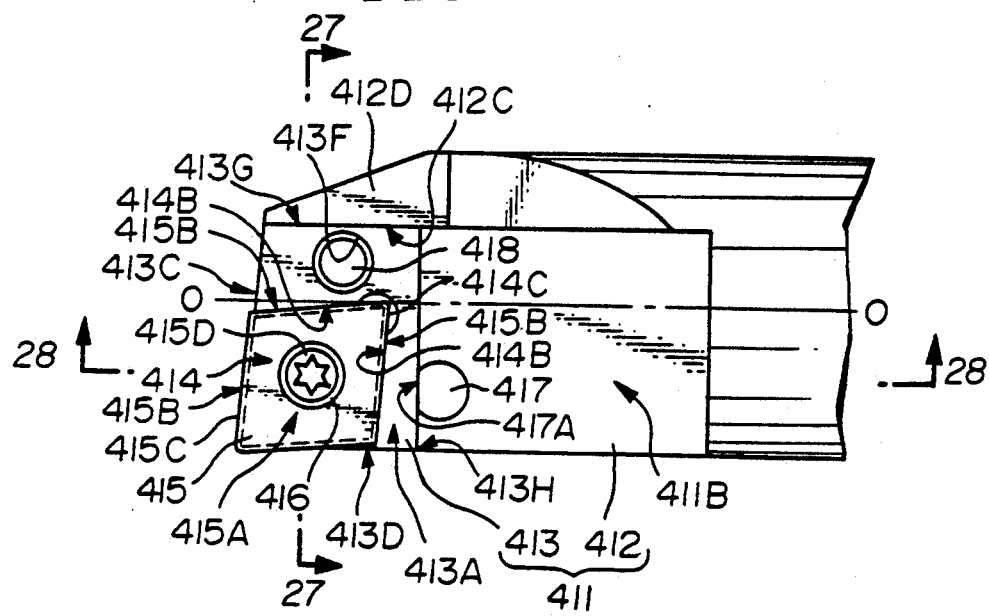
FIG. 26 is a plan view of the front end of a cutting tool according to the fifth embodiment of the invention.
Figure 27:
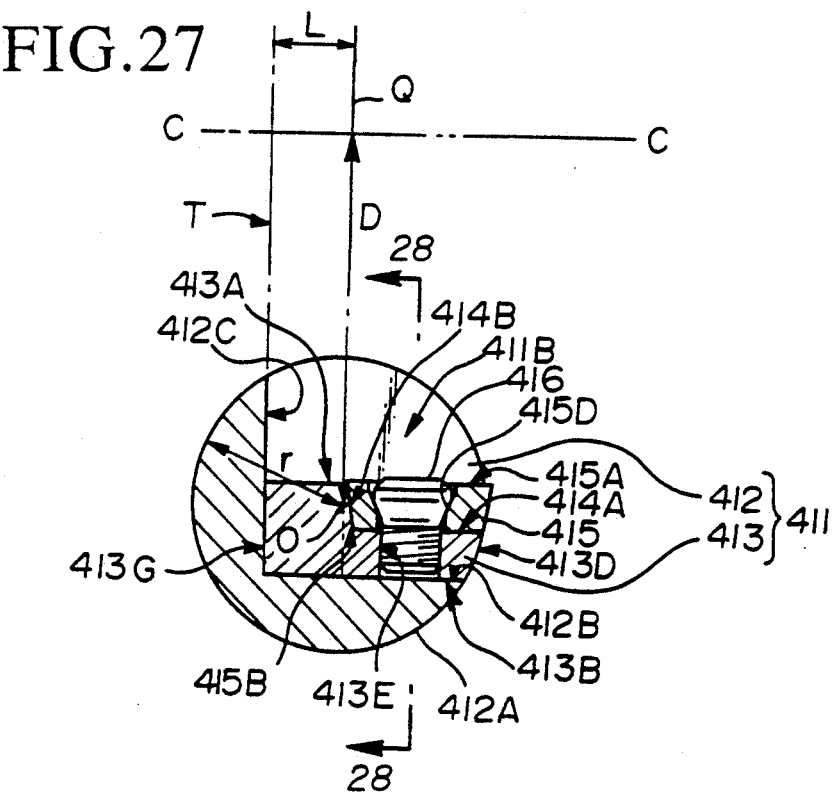
FIG. 27 is a cross-sectional view taken along the line 27—27 in FIG. 26.
Figure 28:
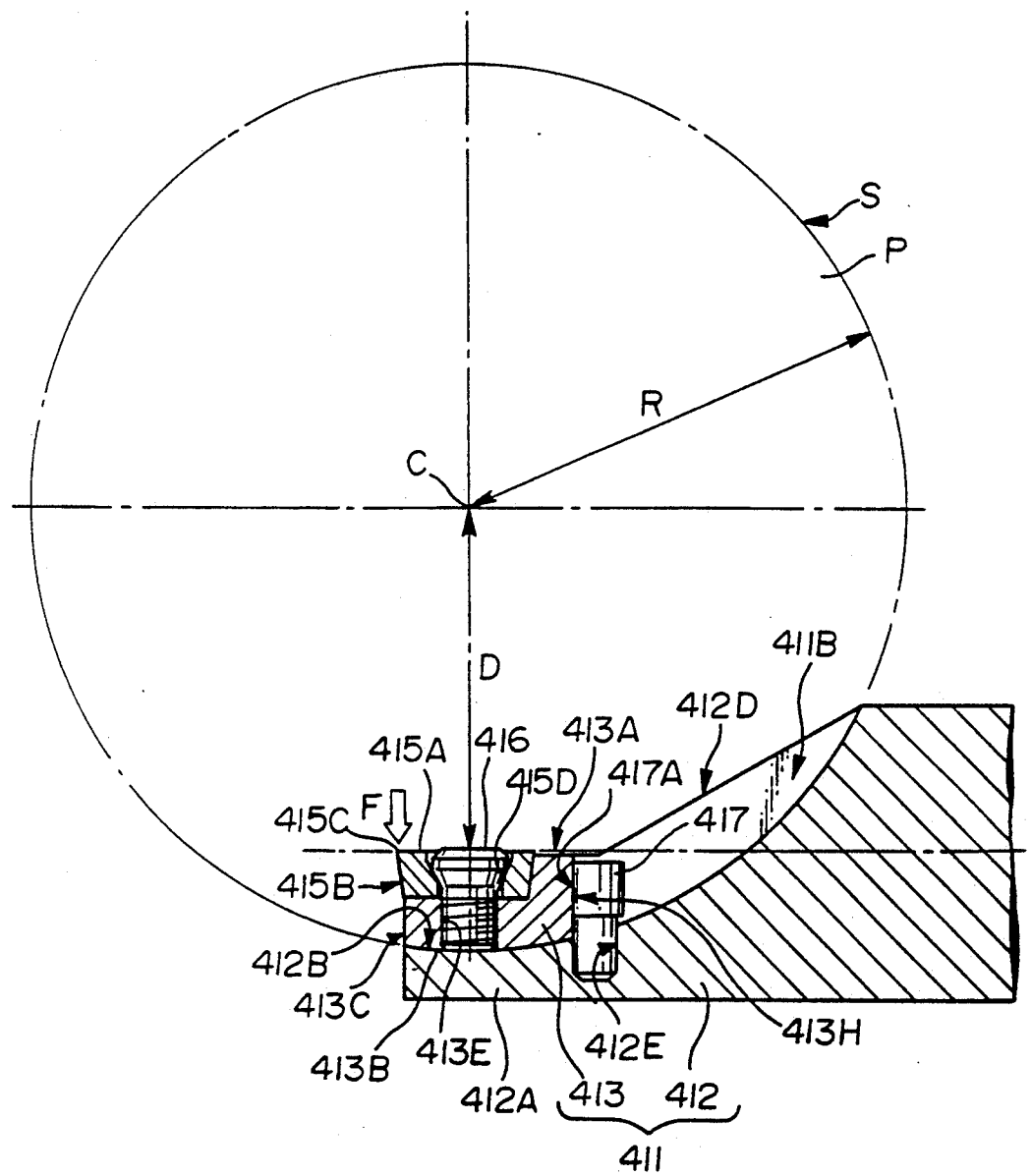
FIG. 28 is a cross-sectional view taken along the line 28—28 in FIGS. 26 and 27.

FIGS. 26 through 28 illustrate a cutting tool according to the fifth embodiment of the invention.

As shown in the Figures, a tool body 411 consists of a shank 412 and a bit mounting component 413. The bit mounting component 413 is formed with a bit mounting seat 414 to which a bit 415 is secured.

The shank 412 is made of cemented carbide and is formed substantially in the shape of a cylinder having a diameter r.

As shown in FIGS. 27 and 28, a side end of the upper wall portion of the front end 412A of the shank 412 is removed so as to form an arcuately concave face and a side wall 412C perpendicularly rising from the mounting wall 412B. That is, assuming a cylinder P having a diameter R and an axis C perpendicularly arranged with respect to the axis O and separated from the axis O at a distance R, the arcuately concave face is coincident with the radially outer surface S of the cylinder P. The front end of the arcuately concave face is employed as a mounting wall 412 B for the bit mounting component 413. The configuration of the side wall 412C is corresponds to the end face T of the circular cylinder P. As shown in FIG. 27, the side wall 412C is separated from the plane Q which includes the axis O and is perpendicular to the circular cylinder P.

For this construction, the front end 412A of the tool body 411 is formed with a substantially L-shaped portion as shown in FIG. 28; the mounting wall 412B arcuately extends toward the rear end of the tool body 411 and has diameter R.

The diameter R of the cylinder P is set in the range which is more than the distance D between the axes C and O and is less than the total of the distance D and the diameter r. The distance L between the side wall 412C and the plane Q is less than the diameter r of the shank 412.

The rear end of the mounting wall 412B is connected to the radially peripheral surface of the shank 412. The upper face 412D adjacent the side wall 412C extends toward the rear end of the tool body 411, and the rear end of the upper face 412D is connected to an inclined face downslope toward the front.

The bit mounting component 413 mounted to the mounting wall 412B is a plate-like rectangular-shape and is made of tougher material than cemented carbide composing the shank 312, such as steel or sintered metal, capable of machining. The upper face 413A of the bit mounting component 313 is formed in a plane face. The lower face 413B of the bit mounting component 413 is formed in a circular convex face having a diameter R which is identical to the diameter R of the radially outer surface S of the circular cylinder P according to the concave mounting wall 412B. For this construction, the lower face 413B can be employed as a mounting face 413B adhering to the mounting wall 412B of the shank 412.

The bit 415 is designed in the same manner as the bit 315 in the fourth embodiment. That is, the bit 415 has a substantially a parallelogram shape in plane view, a plurality of cutting edges 415C formed at the intersections between the upper face 415A and side faces 415B and a through hole 415D in which is inserted a clamping screw 416 at the center of the upper face 415A.

The bit mounting seat 414 is disposed at a corner of the bit mounting component 413, and recessed from the upper face 413A of the bit mounting component 413. The bit mounting seat 414 is opened to the upper face 413A, the front end face 413C and a side face 413D of the bit mounting component 413. The bottom wall 414A of the bit mounting seat 414 is formed in a parallelogram shape according to the configuration of the bit 415.

The bit mounting seat 414 is designed in the same manner as the bit mounting seat 314 in the fourth embodiment. That is, the bit mounting seat 414 has side walls 414B downslope toward the center of the mounting seat 414, a relief 414C for the corner of the bit 415, a tapped hole 413E for mounting the bit 415 and a tapping through hole 413F for mounting the bit mounting component 413 to the mounting wall 412B. Similarly as in the fourth embodiment, the shank 412 is formed with a through hole (not shown) coaxial to the tapping hole 413F.

A stopper piece 417 is attached at the rear side of the mounting wall 412B. The stopper piece 417 is in the form of a pin formed with a flat face 417A at the radially outer surface thereof. The stopper piece 417 is rigidly inserted in a hole 412E formed on the shank 412 perpendicularly to the upper face 413A and arranged such that the flat face 417A faces toward the front. The rear portion of the mounting wall 412B from the stopper piece 417 is employed as a chip pocket 411B.

The bit mounting component 413 is secured to the front end 412A of the shank 412 by a clamping screw 418 inserted in the through hole of the shank 412 and secured to the tapping hole 413F in the condition in which the mounting face 413B contacts the mounting wall 412B; the side face 413G contacts the side wall 412C; and the rear side face 413H contacts the flat face 417A of the stopper piece 417. The bit 415 is located on the bit mounting seat 414 such that the side faces 415B thereof contact the side walls 414B of the bit mounting seat 414, and the bit 415 is secured to the bit mounting seat 414 by the clamping screw 416 inserted in the through hole 415D and secured to the tapping hole 413E of the bit mounting component 413.

In the cutting tool constructed as above, the same advantages as in the fourth embodiment can be obtained. That is, in the cutting tool, cutting force exerted on the bit 415 is received by the bottom wall 414A of the bit mounting seat 414, and high resistance against the cutting force can be obtained and separation of the shank 412 and the bit mounting component 413 can be prevented, the high rigidity of the shank 412 is ensured, and the damping capacity of the tool body 411 is increased, so that vibration and chatter of the cutting tool can be effectively prevented. Furthermore, since the bit mounting component 413 is supported by the side wall 412C, the bit mounting component 413 can be rigidly secured to the mounting wall 412B even though the lateral force is exerted on the cutting edge 415C.

Specifically, in the cutting tool, since the mounting wall 412B is in the shape of a concave face arcuately extending toward the rear end of the tool body 411, and the mounting face 413B of the bit mounting component 413 is in the shape of a convex face corresponds to the concave face, the bit mounting component 413 is engaged with the bottom wall 412B in the direction of the axis O of the tool body 411. Furthermore, since the bit mounting component 413 is supported by the stopper piece 417 disposed at the rear side of the bit mounting component 413, the bit mounting component 413 can be rigidly secured even though large cutting force toward the rear end is exerted on the cutting edge 415. Therefore, in the cutting tool, high resistance against the cutting force directed in all directions can be obtained, and the bit 415 can be effectively fixed in position.

Moreover, in the cutting tool, since the wall portions of the side wall 412C and the mounting wall 412B are uniformly machined so as to form an L-shaped portion in front view, the rigidity of the front end 412A of the tool body can be further increased, and therefore, chatter of the tool body 411 can be more effectively prevented.

In addition, in the above cutting tool, since the thickness of the bit mounting component 413 increases toward the front end thereof from the rear end thereof and the tapping hole 413E is formed at the thickest portion of the bit mounting component 413, sufficient depth of the tapping hole 413E can be ensured without machining of the shank 412 made of cemented carbide, and therefore, the screw-on type cutting tool can be easily manufactured. According to a variation of the thickness of the bit mounting component 413, the thickness of the mounting wall 412B and the bottom wall of the chip pocket 411B increases toward the rear end of the tool body 411, which ensures the rigidity of the front end of the shank 412.

Thus, in the above cutting tool, a screw-on type cutting tool can be easily constructed and the rigidity of the tool body 411 can be ensured.

The mounting wall 412B can be easily formed by means of a grinding wheel having the same diameter as the mounting wall 412B.

The diameter R of the mounting wall 412B is chosen according to the diameter r of the shank 412. The ratio r/R is preferably set in the range of 0.2 to 0.5. When the ratio r/R is more than 0.5, the mounting wall 412B will be nearly flat, which is not desirable. When the ratio r/R is less than 0.2, the area of the mounting wall 412B will not be sufficient.

As mentioned above, in the cutting tool according to the present invention, since the mounting wall secures the bit mounting component along the direction perpendicular to the direction of the cutting force, the cutting force does not act to shear the soldered layer between the shank and the bit mounting component, so that high resistance against the cutting force can be obtained and separation of the shank and the bit mounting component can be prevented.

Furthermore, in the cutting tool, since the shank made of cemented carbide extends as far as the vicinity of the cutting edge, high rigidity of the tool body is ensured, and the damping capacity of the tool body is increased, so that vibration and chatter of the cutting tool can be effectively prevented.

What is claimed is:

1. A through-away cutting tool comprising:
   a tool body having a front end and a rear end, said tool body having a rod-like shank made of cemented carbide and a bit mounting component made of at least one of steel and sintered metal arranged at the front end of said tool body, said shank having a mounting wall extending toward the front end of the tool body, said bit mounting component being in the shape of a plate having an upper face and a lower face;
   a bit mounting seat formed at the front end of the bit mounting component and having a bottom wall recessed from the upper face;
   an indexable cutter insert being mounted to the bit mounting seat;
   a protrusion projecting from said lower face of the bit mounting component;
   a tapped hole formed in the protrusion at the bottom wall of the bit mounting seat;
   a hole formed at the mounting wall of the shank and arranged so as to fit to the protrusion;
   wherein said bit mounting component being secured to the shank adhering the lower face thereof to the mounting wall of the shank and fitting the protrusion in the hole so as to bear cutting force exerted on the indexable cutter insert by the mounting wall.

2. A throw-away cutting tool comprising:
   a tool body having a front end and a rear end, said tool body having a rod-like shank made of cemented carbide and a bit mounting component made of at least one of steel and sintered metal arranged at the front end of said tool body, said shank having a mounting wall extending toward the front end of the tool body, said bit mounting component being in the shape of a plate having an upper face, a lower face and side faces peripherally lying between the upper face and the lower face;
   a bit mounting seat formed at the front end of the bit mounting component;
   an indexable cutter insert being mounted to the bit mounting seat;
   a side wall rising from the mounting wall of the shank;
   wherein said bit mounting component is fixed to the shank adhering the lower face thereof to the mounting wall and adhering at least one of the side faces to the side wall of the shank so as to bear cutting force exerted on the indexable cutter insert by the mounting wall
   said bit mounting component comprising:
     a tapped through hole extending in the direction of the thickness of the bit mounting component, said front end of the shank comprises a through hole coaxially arranged with respect to the tapped hole of the bit mounting component mounted to the shank;
     a hollow clamping means having a male screw formed on the periphery outer surface thereof and a female screw formed on the inner side wall thereof;
     said hollow clamping means being inserted into the through hole and being secured to the tapped through hole, so that the bit mounting component being secured to the shank, said indexable cutter insert is secured by a clamping screw inserted therein and secured to the female screw of the hollow clamping means.

3. A throw-away cutting tool in accordance with claim 2, wherein said hollow clamping means comprising a cylinder-shaped shank having a peripheral outer surface and an inner side wall, said outer surface being formed with a male screw and said inner side wall being formed with a female screw.

4. A throw-away cutting tool comprising:
   a tool body having a front end and a rear end, said tool body having a rod-like shank made of cemented carbide and a bit mounting component made of at least one of steel and sintered metal arranged at the front end of the tool body, said shank having a mounting wall extending toward the front end of the tool body, said bit mounting component being in the shape of a plate having an upper face and a lower face;

a bit mounting seat formed at the front end of the bit mounting component;

an indexable cutter insert being mounted to the bit mounting seat;

said mounting wall being in the shape of an arcuate concave face having a center axis parallel to the lengthwise direction of the tool body;

said lower face of the bit mounting component being a convex face corresponding to the concave face of the mounting wall;

said bit mounting component being mounted to the shank adhering the lower face thereof to the mounting wall so as to bear cutting force exerted on the indexable cutter insert by the mounting wall.

5. A throw-away cutting tool comprising:

a tool body having a front end and a rear end, said tool body having a rod-shaped shank made of cemented carbide and a bit mounting component made of at least one of steel and sintered metal arranged at the front end of said tool body, said shank having a mounting wall extending toward the front end of the tool body, said bit mounting component being in the shape of a plate having an upper face and a lower face;

a bit mounting seat formed at the front end of the bit mounting component;

an indexable cutter insert being mounted to the bit mounting seat;

said mounting wall being in the shape of an arcuate concave face having a center axis perpendicular to the lengthwise direction of said tool body;

said lower face of the bit mounting component being a convex face corresponding to the concave face of the mounting wall;

said bit mounting component being mounted to the shank adhering the lower face thereof to the mounting wall so as to bear cutting force exerted on the indexable cutter insert by the mounting wall.

* * * * *